(12) United States Patent
Davis et al.

(10) Patent No.: US 8,201,188 B2
(45) Date of Patent: Jun. 12, 2012

(54) DEVICE-HOSTED SERVICES OVER MEDIA TRANSFER PROTOCOL

(75) Inventors: Darren Davis, Woodinville, WA (US); David Goll, Seattle, WA (US); John Felkins, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1148 days.

(21) Appl. No.: 11/903,039

(22) Filed: Sep. 20, 2007

(65) Prior Publication Data

US 2009/0083764 A1    Mar. 26, 2009

(51) Int. Cl.
*G06F 13/00*    (2006.01)
(52) U.S. Cl. ........................................ 719/316; 709/227
(58) Field of Classification Search ................... 719/316; 709/227
See application file for complete search history.

(56) References Cited

U.S. PATENT DOCUMENTS

| | | | |
|---|---|---|---|
| 6,298,428 B1 | 10/2001 | Munroe et al. | |
| 6,735,634 B1 | 5/2004 | Geagan, III et al. | |
| 6,754,661 B1 | 6/2004 | Hallin et al. | |
| 7,096,226 B2 | 8/2006 | Brock et al. | |
| 7,171,475 B2 | 1/2007 | Weisman et al. | |
| 7,185,094 B2 | 2/2007 | Marquette et al. | |
| 7,240,109 B2 | 7/2007 | Wookey et al. | |
| 2002/0112058 A1 | 8/2002 | Weisman et al. | |
| 2002/0156896 A1* | 10/2002 | Lin et al. ...................... | 709/227 |
| 2004/0088713 A1 | 5/2004 | Myllymaki et al. | |
| 2005/0066335 A1 | 3/2005 | Aarts | |
| 2005/0091672 A1 | 4/2005 | Debique et al. | |
| 2005/0182989 A1 | 8/2005 | Zarnke et al. | |
| 2005/0202392 A1 | 9/2005 | Allen et al. | |
| 2005/0226430 A1 | 10/2005 | Kreifeldt et al. | |
| 2005/0246375 A1 | 11/2005 | Manders et al. | |
| 2005/0289264 A1 | 12/2005 | Illowsky et al. | |
| 2006/0015722 A1 | 1/2006 | Rowan et al. | |
| 2006/0031384 A1 | 2/2006 | Manders et al. | |
| 2006/0031545 A1 | 2/2006 | Manders et al. | |
| 2006/0174021 A1 | 8/2006 | Osborne et al. | |

(Continued)

FOREIGN PATENT DOCUMENTS

KR    10-2006-0095554 A    8/2006

(Continued)

OTHER PUBLICATIONS

Nakao, et al., "Constructing End-to-End Paths for Playing Media Objects", Date: 2001, pp. 1-12.

(Continued)

*Primary Examiner* — Andy Ho
(74) *Attorney, Agent, or Firm* — Mayer & Williams P.C.

(57) ABSTRACT

An arrangement for exposing self-describing device-hosted services on a client device to a host application or processes over MTP (Media Transfer Protocol) is provided by which an MTP extension comprising new MTP commands enables the device-hosted services to be backwards and forward compatible with existing MTP implementations. The new MTP commands in the extension enable discovery by the host of device-hosted services provided by a connected client device. In an illustrative example, the device-hosted services include storage services which supplement traditional MTP storages with service features, functional device services which support message-based interaction between the host and client device, and information services which may simply present a rich, static dataset of information to the host rather than providing additional storage or functional capabilities. These device-hosted services advantageously enable richer communication between the host and client device.

20 Claims, 7 Drawing Sheets

U.S. PATENT DOCUMENTS

| | | |
|---|---|---|
| 2007/0033327 A1 | 2/2007 | Sinclair |
| 2007/0100893 A1 | 5/2007 | Sanders |
| 2007/0103984 A1 | 5/2007 | Kavuri et al. |
| 2007/0113246 A1 | 5/2007 | Xiong |
| 2007/0130233 A1 | 6/2007 | Christensen |
| 2007/0136327 A1 | 6/2007 | Kim et al. |
| 2008/0071834 A1 | 3/2008 | Bishop |
| 2008/0195749 A1* | 8/2008 | Krig .............................. 709/232 |

FOREIGN PATENT DOCUMENTS

| | | |
|---|---|---|
| WO | 2007011164 A1 | 1/2007 |
| WO | 2007022875 A1 | 3/2007 |
| WO | 2007047960 A2 | 4/2007 |

OTHER PUBLICATIONS

Kochut, et al., "Managing Virtual Storage Systems: an Approach Using Dependency Analysis", Date: Mar. 24-28, 2003, pp. 593-604.

Media Transfer Protocol Enhanced; Aug. 31, 2006; chapters 1, 4, and 5; 37 pages.

Mark Hammond and Andy Robinson; Python Programming on Win32; chapter 12; Jan. 2000; 35 pages.

International Search Report and Written Opinion Received for PCT Application No. PCT/US2008/074219, mailed on Mar. 23, 2009, 11 pages.

"PocketDJ Now Supports Janus", http://www.delldjsite.com/forums/archive/index.php/t-4371.html, Feb. 2005.

"Portable Media Players for Windows Vista", Date: 2003.

"OneBridge Mobile Data Suite 5.0" Date: 2005.

"xAssets", Jun. 5, 2007.

Rischpater, Ray, "Scheme for Client-Side Scripting in Mobile Web Browsing or AJAX-Like Behavior without Javascript", Date: 2006.

Rosenblatt, Bill, "Nokia and Microsoft Bridge OMA-WMA Gap for Mobile Devices", Date: Feb. 17, 2005.

* cited by examiner

DEVICE-HOSTED SERVICES OVER MEDIA TRANSFER PROTOCOL

BACKGROUND

Microsoft Corporation developed the Media Transfer Protocol ("MTP") to manage content on any portable device with storage. It is based upon an existing protocol, Picture Transfer Protocol ("PTP"), and may be implemented to be fully compatible with that protocol. MTP is typically used to facilitate communication between devices that connect to a personal computer ("PC") or other host, exchange data, and then disconnect for standalone use. A secondary purpose of MTP is to enable command and control of a connected device. This includes remote control of device functionality, monitoring of device-initiated events, and reading and setting of device properties.

Simple devices can implement a minimal set of MTP functionality, which allows device vendors to develop a product with minimal investment in firmware and drivers. More advanced devices can take advantage of the full MTP feature set or extend it with vendor-specific plug-ins. For example, MTP may be used to transfer images, audio, video, playlists, or any other media object. MTP also provides direct control over device operations, including transport controls, which will be exposed through the operating system to applications. By attaching metadata to objects in a form that is accessible to devices, MTP can associate properties such as Artist, Album, Genre, and Track, in a general way to facilitate device user interface.

MTP may be used to match files that are shared between device contents and libraries on the PC to enable synchronization of data such as contact and task lists. MTP also provides a tool for optimized content description that can index devices with large storage and thousands of items very quickly to thereby initialize operations for large-capacity storage devices. References may also be used to associate one file with another, which is useful for creating playlists and associating DRM (Digital Rights Management) licenses with content.

Device manufacturers can take advantage of MTP class driver support to help reduce the need to design, develop, and support a proprietary device connectivity solution. MTP is tightly and predictably integrated with the Microsoft Windows® device architecture, which helps reduce the cost of developing third-party applications and helps to ensure compatibility with future versions of Windows. MTP is also generalized and extendable so that manufacturers can implement a common solution for multiple device models and classes through simple scaling, which helps to reduce firmware development costs and improve stability.

Since the introduction of MTP, Microsoft Corporation has also developed the Windows Portable Device ("WPD") platform. The WPD API (Application Programming Interface) provides an abstraction of device connectivity protocols from Microsoft Windows applications to encourage a richer ecosystem of devices. While MTP is the premier WPD device connectivity protocol, device vendors with proprietary or other standards-based protocols are able to also register as a device connectivity model within the WPD framework, enabling their devices to also work with unmodified WPD aware applications. Many of the concepts in WPD inherit directly from MTP behaviors and therefore much of the functionality available to WPD applications has a direct correlation to the functionality available from devices using MTP as a connectivity protocol.

MTP has proven to be well suited to the task of representing file system objects and associated metadata in a rich and useful way. However, while MTP performs entirely satisfactorily in many applications, additional features and functionalities that utilize the protocol and maintain compatibility with it are still generally desirable.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An arrangement for exposing self-describing device-hosted services on a client device to a host application or process over the MTP protocol is provided by which an MTP extension comprising new MTP commands enables the device-hosted services to be backwards and forward compatible with existing MTP implementations. The new MTP commands in the extension enable discovery by the host application, such as those running on a PC, of device-hosted services provided by a connected client device. In an illustrative example, the device-hosted services include storage services which supplement traditional MTP storages with service features, functional device services which support message-based interaction between the host and client device, and information services which may simply present a rich, static dataset of information to the host rather than providing additional storage or functional capabilities. These device-hosted services advantageously enable richer communication between the host and client device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Similar reference numerals indicate similar elements in the drawings.

DETAILED DESCRIPTION

Figure 1:
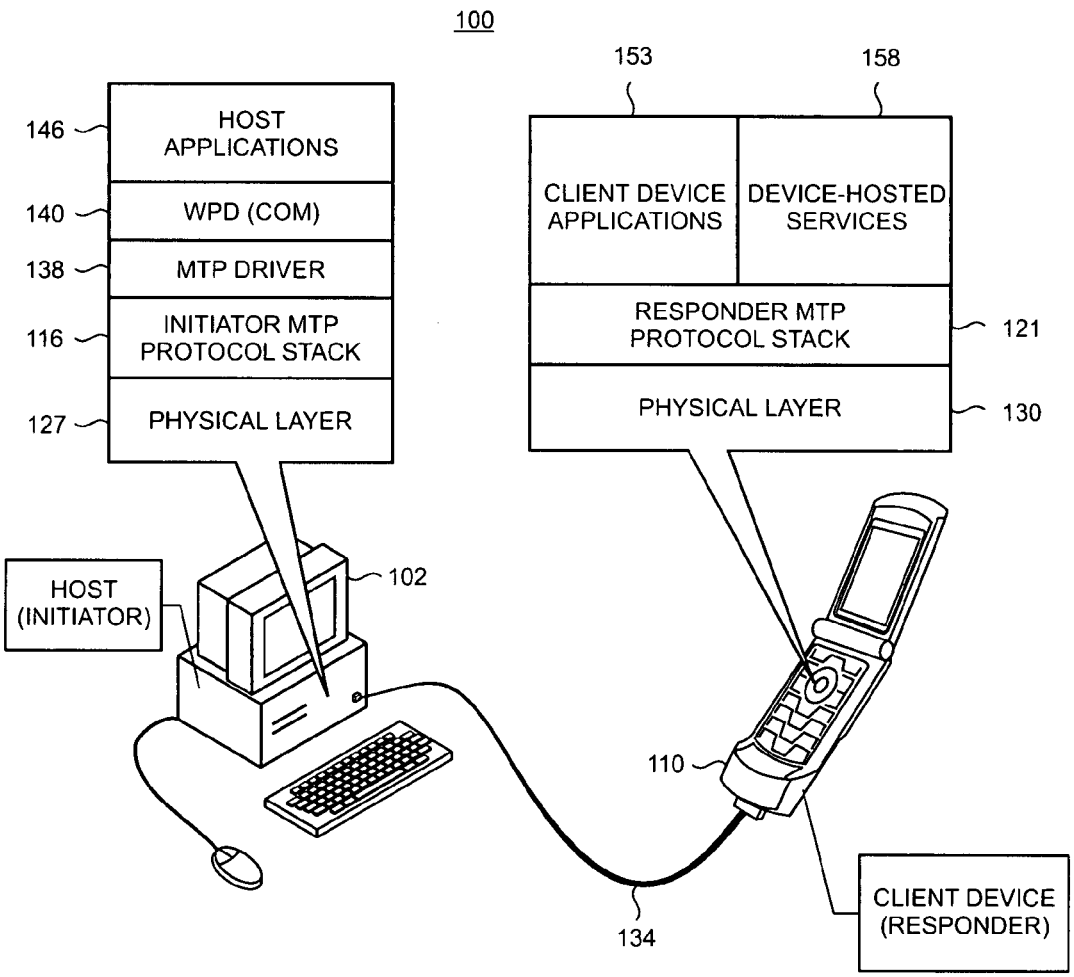
FIG. 1 shows an illustrative MTP environment in which a host and client device communicate using MTP.

Traditionally PCs view devices as fixed function hardware that goes into a slot inside the case and provides the specific functionality they were built to do. For example, a video card will always translate images in computer memory to a display device, a modem will always provide a way to create a communication link with another modem, or a hard disk controller will always allow data to be transferred from computer memory to the magnetic storage surface for more permanent storage. In some cases, these devices are not physically installed in the computer—they may be simply connected to it. A printer, like a video card, will always just translate some data in memory to a physical representation on a sheet of paper.

More and more new devices are being purchased by consumers that do not adhere to this simple "single function" model. These devices, represented by electronic instrumentalities such as mobile phones, portable media players, personal navigation devices, personal information managers, and other "portable" computing devices, are getting ever more complex, with ever more functionality, and are becoming ever more capable of supporting rich consumer customization through the addition of custom applications. To date, however, most of these devices still interact with PCs in a fixed-function fashion. For example, a mobile phone might connect as three fixed-function devices—a modem, a file sharing device, and an audio output device. This is frequently problematic because many desktop platforms do not robustly handle the fact that the same device is exposing multiple different functions.

In many ways this behavior is a direct result of the technologies devices use to connect to PCs. Most devices connect over peer-to-peer cable-based connection models such as USB, Bluetooth, IDE (integrated/Intelligent Drive Electronics), SATA (Serial Advanced Technology Attachment), or other point-to-point models. The protocols running over these communication links are targeted and task-specific with little room for new functionality. Where new functionality is enabled it typically comes in the form of function-specific extensibility rather than a rich, general extensibility model. In addition, the process of adding additional functionality, either to the protocol or the device, requires new drivers to be written and installed at both ends of the pipe. This places burden on the device manufacturer because it must now create not only the firmware for the device but also the appropriate drivers, on all desired host platforms, to leverage that functionality.

Within the TCP/IP (Transport Control Protocol/Internet Protocol) networking world a rich fabric of connectivity has enabled development of richer data exchange models. Very task-specific protocols, like those in the peer-to-peer cable world, are still in heavy use, including protocols for delivering e-mail (e.g., over "SMTP"—Simple Mail Transfer Protocol), retrieving files (e.g., over "FTP"—File Transfer Protocol) and data streams (e.g., over "HTTP"—HyperText Transfer Protocol), or printing files (using "LPR"—Line Printer Remote), but they have been augmented by a higher layer of "protocol" behavior. In OSI (Open Systems Interconnect) model terms, protocols that were once considered at the highest layer of the stack (i.e., application) are themselves being used as a presentation means for even richer data exchanges. For example, consider how HTML (HyperText Markup Language) has become a protocol on top of HTTP. At its core, HTML is really a protocol for exchanging information about the layout of a set of elements on a page.

However, through extensions and scripting models HTML over HTTP has become a way to deliver full applications enabling new, rich web clients to be developed, complete with custom behaviors and rich extensibility. Another example of how HTTP has moved from an application to presentation protocol is web services. In this environment, requests for remote execution of operations are carried over the HTTP-presentation to a remote host. The introduction of web services and service-oriented architectures has dramatically changed the way in which distributed computing problems are addressed and has encouraged a more service-focused architecture. In fact, the use of web services within web-hosted HTML-based client applications only increases the value of the HTTP protocol at the presentation layer.

Key to the growth of these solutions is the fact that both HTML and web services have provided new, rich ways for thin-client developers to take advantage of these technologies to produce rich, distributed solutions. Web services also benefit thicker clients in the same way as thin-clients by creating a powerful solution upon which service oriented architectures may be built. Many of the latest and most popular web sites make extensive use of advanced HTML protocol-like features and web service-like features to deliver their functionality.

In peer-to-peer cable-connected environments a desire exists for similar "re-factoring" of what has traditionally been thought of as an "application" layer protocol to a "presentation" layer protocol for the purpose of keeping device capabilities and connected data exchange at similar levels. Unlike the TCP/IP world, however, not everything is already running on the same underlying transport protocol.

Such shortcomings are addressed by the present arrangement for device-hosted services by which an extension to the MTP protocol enables an environment in which device-hosted services may be developed and utilized to enable richer data exchanges between MTP hosts and client. The power of such device-hosted services is further extensible to web experiences and other thin-client solutions through a scripting interface by which the device-hosted services are exposed in these environments.

It is emphasized that the term "media" in MTP is used to identify any binary data and is accordingly not restricted to audio/video formats to which it is commonly applied. Some typical examples of non-audio/video objects include contacts, programs, scheduled events, and text files. Media objects are required to be represented as atomic binary objects during transfer in an MTP session, but are not required to be stored in the same format or structure on the device. Media objects may be created on-demand, as long as they are accurately represented during content enumeration. MTP objects consist of not only the binary content of the file, but also the descriptive metadata and references. MTP is designed such that objects can be recognized through the mechanisms that are provided in the protocol without requiring an understanding of the binary format of the file itself. Thus, in MTP, an "object" is the combination of the binary file, its descriptive metadata, and any intra-object references.

It will also be appreciated that device behaviors defined by MTP are represented within the Microsoft Windows platform using WPD. While the material herein is described in terms of the MTP implementation, analogous implementation also exists within the WPD framework so that Microsoft Windows applications may take advantage of the extensions made to MTP to address these shortcomings. Furthermore, because of the nature of WPD as an agent for abstraction, it is possible to construct alternate embodiments of the material described herein which provide similar or identical functionality to MTP by either directly or indirectly using analogous forms and implementation to those described here without using the MTP protocol itself.

Turning now to the drawings, FIG. 1 shows an illustrative MTP environment 100 in which a host 102 and client device 110 communicate using MTP. MTP is an object-based protocol that abstracts device capabilities, objects, and object properties so that they can be exchanged with the host independently of device implementation. Microsoft Corporation developed MTP at least in part in response to difficulties users have experienced in connecting their portable devices such as media players to a Windows-based PC. When hardware vendors introduced the first portable devices, the devices from each vendor used a proprietary protocol for communicating with the computer. Each vendor supplied a driver that ran on the Windows-based PC to communicate with their devices. Users were unable to use these portable devices until they had located and installed the appropriate drivers for their devices.

To improve the user experience and relieve hardware vendors of the task of writing drivers, Microsoft has defined MTP as a standardized protocol for communication between portable media players and Windows computers. In place of proprietary drivers, Microsoft supplies a universal MTP driver that runs on Windows-based computers. The MTP driver communicates with all MTP-compatible devices and is generally provided as part of the Windows operating system. A user can simply connect the device to the Windows computer to enable the device and the PC to communicate without requiring further set-up.

Microsoft has defined the MTP protocol as a client extension to PTP for digital still cameras. For information about PTP, see the PIMA 15740 (PTP) specification "Picture Transfer Protocol (PTP) for Digital Still Photography Devices," Version 1.0 supported by the International Imaging Industry Association, ("I3A") (see http://www.i3a.org/), formerly known as the Photographic and Imaging Manufacturers Association ("PIMA"). The MTP Specification is available, for example, at http://download.microsoft.com. MTP is also currently under submission and evaluation with the USB Implementers Forum and may be incorporated into USB-IF MTP v1.0 in the future.

It is emphasized that while the illustrative example shown in FIG. 1 and described here is implemented in a Windows operating system environment, the present arrangement for device-hosted services over MTP is not limited to Windows implementations or Windows-based services. Depending on the requirements of a specific application, other commonly utilized operating system environments may be utilized to support device-hosted services over the MTP protocol. For example, there are current MTP implementations for the Apple® UNIX, and Linux operating systems.

MTP exchanges may only occur between two devices at a time, and in each communication, one device acts as the "initiator" and the other as the "responder." The initiator is the device that initiates actions with the responder by sending operations to the responder. The responder may not directly initiate any actions (although it may be possible for a responder to "event" requests for servicing to the host to thereby initiate actions), and may only send responses to operations sent by the initiator or send events. Devices may act as an initiator, a responder or both. How a device initially determines whether it will act as initiator or responder in an MTP session will be defined in a transport-specific manner as or responder discovery process.

In the illustrative MTP environment 100 shown in FIG. 1, the host 102 is typically the initiator and the client device 110 is the responder. As shown in FIG. 1, the host 102 is configured as a desktop PC and the client device 110 is configured as a mobile phone. However, it is emphasized that these particular devices, and their roles as initiator and responder, are merely illustrative as the present arrangement for device-hosted services over MTP may be flexibly applied to any of a variety of MTP-compatible devices and either device may act as an initiator or responder (or both) depending on a particular usage scenario.

Such MTP-compatible devices may be generally defined as electronic devices with some amount of storage that consume or produce media objects in a binary format, which have intermittent connections with other devices, and which fulfill their primary purpose while not connected to another device. Compatible devices generally act primarily as either media consumers or media producers, although this line is becoming increasingly blurred. In addition, while media objects are commonly utilized in the MTP environment 100, MTP also enables transfers of virtually any type of file that can be represented by most modern file systems and thus the present device-hosted services are not limited in dealing solely with media objects.

Some examples of MTP-compatible devices (i.e., those that currently are using MTP or have the capability to use it) include digital cameras (both still and video), audio and/or media players, mobile phones, PDAs (personal digital assistants), Pocket PCs, Smart phones, handheld game players, GPS (Global Positioning System) and other navigation devices, and devices that provide a combination of one or more of such functionalities. Such devices are generally portable. Host-type devices typically include, for example, desktop PCs, laptop and notebook PCs, game consoles, and other types of consumer electronic devices that are configured to support MTP capabilities. However, the specific roles of host and device are not always necessarily rigidly defined, as some host-type devices are capable as being used as client devices and vice versa. And, as noted above which device, client or host takes the respective roles of initiator and responder can also vary.

As shown in FIG. 1, the host 102 and client device 110 are symmetrically configured with MTP protocol stacks to enable bi-directional communication over an MTP session. Accordingly, the host 102 has an initiator MTP protocol stack 116 and the client device has a responder MTP protocol stack 121. These respective MTP protocol stacks provide similar functionalities, but each is typically configured to work within the constraints imposed by the capabilities of their respective devices upon which they operate.

Host 102 and client device 110 are further configured with respective physical layers 127 and 130 that provide a basic interface to the respective host and client hardware which may be implemented, for example, via a driver such as USB (Universal Serial Bus) or other network driver to implement, for example, HP (Internet Protocol) or Bluetooth connectivity between the devices. MTP is intended to be transport-agnostic and may function over multiple underlying transport mechanisms. This feature allows for optimizations in device implementation when connecting over different transports in different models, or even multiple transports enabled in the same device. However, MTP requires certain qualities in the underlying transport in order to function effectively in accordance with the MTP specification. In this illustrative example, the transport is effectuated using USB, and the host 102 and client device 110 are coupled using a USB cable 134. However, it may be desirable in other implementations of the present arrangement to provide connectivity via IP (either wired or wireless) or via Bluetooth, for example.

As noted above, an MTP driver 138 is typically implemented in the Windows operating system and specifically as a user-mode driver. MTP driver 138 interfaces through the Component Object Model ("COM") based Windows Portable Device ("WPD") layer 140 to enable various host applications 146 to engage in an MTP communication session with resources on the client device 110. Such resources may include, for example, client device applications 153, storages, media objects, and device-hosted services 158. Further information about WPD is available at http://download.microsoft.com.

Figure 2:
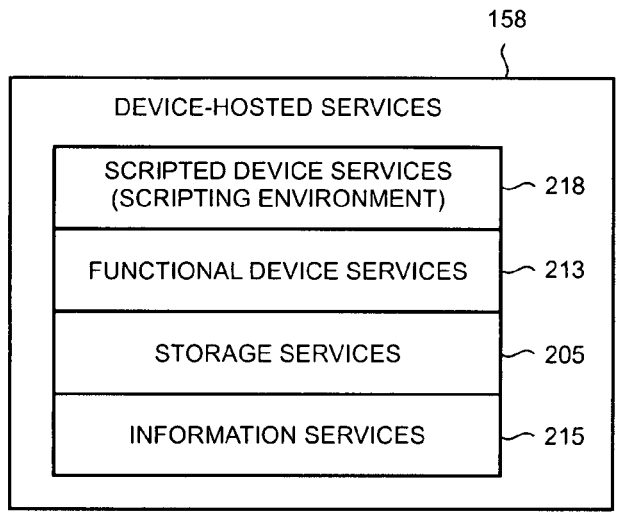
FIG. 2 shows an illustrative services architecture that is supported by the client device shown in FIG. 1.

The device-hosted services are shown in more detail in FIG. 2. In this illustrative example, the device-hosted services include storage services 205, functional device services 213, information services 215, and scripted device services 218 that are utilized to implement accessibility to device services from scripting and other programming environments that operate on the host 102 (FIG. 1). Each of these services is described in turn below.

With regard to storage services 205, it is noted that unlike other file system based transport protocols, such as SCSI (Small Computer System Interface), ATA (Advanced Technology Attachment), or USB mass storage, MTP is independent of specific file system semantics. Transactions operate on objects in a device's object store rather than sectors, tracks, or files in a file system. Each object contains a data stream (the contents of the file) and a set of properties associated with the object (file information, metadata, etc.). Special objects representing folders and other associations (media albums) are defined as well. In each of these cases, the data stream is typically empty and only the properties define the object.

Objects are also associated with storages which represent physical or logical pieces of media on which objects are stored. These storages, like objects, have a limited set of properties associated with them that allow them to express information such as type (fixed or removable) or structure (flat or hierarchical). In addition, storages are bound to device objects. These objects represent the entire device and describe its universe of capabilities as well as information such as name, manufacturer, number and type of commands supported, and number and type of object formats supported.

Additional device properties may also exist which provide default property values for different device behaviors (for example current shutter speed of the camera). As is appropriate for a system of this kind, all MTP properties, objects, formats, and commands are able to be extended through a well defined mechanism. Numerous different implementations of MTP device object stores from numerous vendors exist today. However, MTP has several inefficiencies that are manifested during operation.

While MTP is defined to be agnostic to where and how objects are stored, in common usage it has been almost exclusively used to replicate objects from one media store to another. However as an agent in this process, MTP has only limited support for defining how objects are to be stored on the destination device. That is, if a particular document file is to be stored on a device in a particular location there are no hints about this location provided by the device through MTP. Nor can the device specify that photos are to be stored in a particular location while music goes in another. Users of MTP are left to using conventions to determine where and how files are organized. For example, Microsoft Windows Media Player has imposed a hierarchy on media objects which today represents the de-facto standard for where media content is stored on a storage exposed by MTP. However, as new forms of MTP objects come into usage, such as a contact object (i.e., name, addresses, title, company, telephone, email address, etc.), there is no existing de-facto standard to define either how or where these objects should be stored nor manner to indicate where the device wants them to be stored.

Objects on a device are typically viewed as "files" rather than as proper objects. While MTP was designed around an object store model, most users still think of it as a way to move files from one place to another. This means that objects that have no data stream are treated as a file rather than as a property based object. In addition, given today's primary MTP usage model of file storage, most MTP implementers have optimized their object store to represent the contents of the file system. This poses problems when object specific behaviors are introduced including situations where a binary data stream does not exist.

While MTP is about storage of objects, the fact that its object store is typically a rich view of the file system has limited the concept of storage to associate directly with the different file storage volumes on a particular device. MTP storages typically map 1:1 with physical or logical file storage on the device. This implies that MTP does not have a rich concept of an "object store" which may be a file in the file system (e.g., a database) rather than a specific physical storage volume or some logical partition of it.

Since storages represent physical media, they are typically presented in host user interfaces as different physical locations on which files can be stored. For example, an MTP client device with storage space (file systems) on internal flash storage and a removable storage device (such as a flash card) typically causes MTP host user experiences to show two storage locations on the device ("Device" and "Flash Card"), similar to how it would be presented for hard drives connected to the same desktop PC. If the client device implementer decided to expose another "virtual" storage containing one specific type of content, this storage would also appear as part of the standard storage user experience with other physical stores. This may not be appropriate because MTP does not strictly require the objects in an object store be file system compatible objects.

Currently formats and capabilities are bound to the device and not to the storage on which they reside. Host implementations assume that all storages on the device are capable of supporting all the formats listed. However, if a particular storage is reserved for one particular type of data than the user may be faced with an undesirable experience if attempts are made to store data of an invalid type for that particular storage.

To overcome many of these issues, MTP currently turns to the concept of bulk enumeration. Essentially the entire contents of the device are enumerated either by format or location, at a heavy performance cost, and the "more powerful" host performs the rich aggregation and presentation of objects according to its own desired behavior (for example a media library view in Windows Media Player). While this model works well for desktop PC-based hosts, more consumer electronic hosts are appearing with limited resources to manage the views within its available memory. From an MTP client implementer's perspective, this poses additional challenges as enumeration may now no longer be restricted to just the contents of the file system.

Using the example of the contact object once again, there are several ramifications which result when attempting to transfer a contact object between devices using the current MTP architecture. MTP currently does not define a location on the device where contacts are to be stored. One device vendor may elect to store contacts in a folder off the root called "Contacts" while another may elect to store the "Contacts" folder inside another folder called "Personal Information" at the root of the device. While both methods are equally valid, there is no existing method to inform the host application that this is the intended use of these locations. Outlook, for example, could elect to store contacts in a third location (a "Contacts" folder under "Outlook" under the root) according to MTP. However, because the device does not recognize this contact folder, it may not be able to present these contacts as part of the device contact user experience.

MTP currently views all objects as files. Thus, contacts may be viewed as a file system object—essentially an object in which the data stream is empty because all of the properties completely describe the object. Assumptions made today by device manufacturers typically result in an empty file being created because objects represent files. Accordingly, a user, upon seeing these files, will not necessarily be able to do anything with them, and will likely question why they show up at all.

MTP currently assumes that all storages are physical. Thus, for example assume that contacts are stored in a contact database instead of as files in a folder. If the contact database is represented as an item in the file store, rather than the contacts in it, then the database will be enumerated via standard MTP enumeration models as a single file system object on a particular storage device. To actually expose the contacts, the MTP client implementation would need special case handling of the contact file and handle it as a "virtual" folder that can be further enumerated to discover individual contacts.

MTP host implementations typically treat all available storages as different physical storages on the device. Consider, for example, an MTP client device implementer who elects to create a separate storage on which contacts will be stored rather than dealing with them as a "virtual" folder. This has the unfortunate result of exposing this separate storage as a new physical storage on the device. While this may be acceptable for contacts, as new stores are exposed in this manner (calendar, mail, credentials, credit card/wallet, etc.) this makes it more difficult for the user to differentiate between where files may be stored compared to where specific objects may be stored.

MTP object formats are bound to the device. Continuing with the illustrative example of exposing the contact database as a separate MTP storage, the client and host implementers must deal with the fact that the device supports different types of formats in different storages on the device. This may further complicate the user's experience with the device because the user must know not only what type of data can be stored on each storage, but may have the unfortunate experience of attempting to place the data where the user believes it belongs only to be told that such location is not supported.

MTP relies on bulk enumeration to work around many of these issues. In today's world where MTP client devices typically represent only one type of object store, typically a media store, this is a reasonable solution to hiding the physical implementation of the device from the user. However, when the contact data store is added, the complexity of enumeration for both the host and client device implementations is increased. On the host, additional code and memory should be added in most settings in order to collect and manage the contact entries separately from the media entries. This may not be reasonable if the host is executing on a less powerful consumer electronic device. On the client device side, enumeration is now complicated by the fact that different types of data must be tied together from multiple sources to complete the enumeration request.

In light of these inefficiencies, to broaden the effectiveness of MTP in dealing with non-file bound data types, a new enumeration model called "device-hosted services" is provided which includes storage services 205 as noted above. This model rectifies many of the limitations described above while simultaneously addressing other extensibility challenges in MTP as it exists today.

Figure 3:
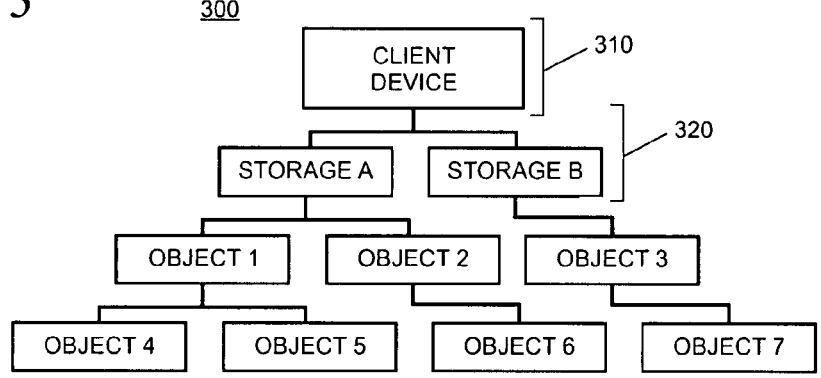
FIG. 3 shows an illustrative generalized object hierarchy that may be utilized by existing implementations of MTP.

FIG. 3 shows an illustrative generalized object hierarchy 300 that may be utilized by existing implementations of MTP. The top two levels of the object hierarchy, client device and storage, respectively indicated by reference numerals 310 and 320, are more tightly defined than deeper layers in the hierarchy 300. Standard MTP enumeration first identifies and extracts information about the device using the MTP command GetDeviceInfo and its attached storages using the commands GetStorageIDs and GetStorageInfo. Beyond this point, enumeration is done by any number of bulk operations which operate similar to standard Windows Win32 file system APIs for locating files of a specific type (e.g., searching by extension), representing the hierarchy (e.g., finding directories), and acquiring information about each (e.g., opening the file or getting file system catalog information).

Figure 4:
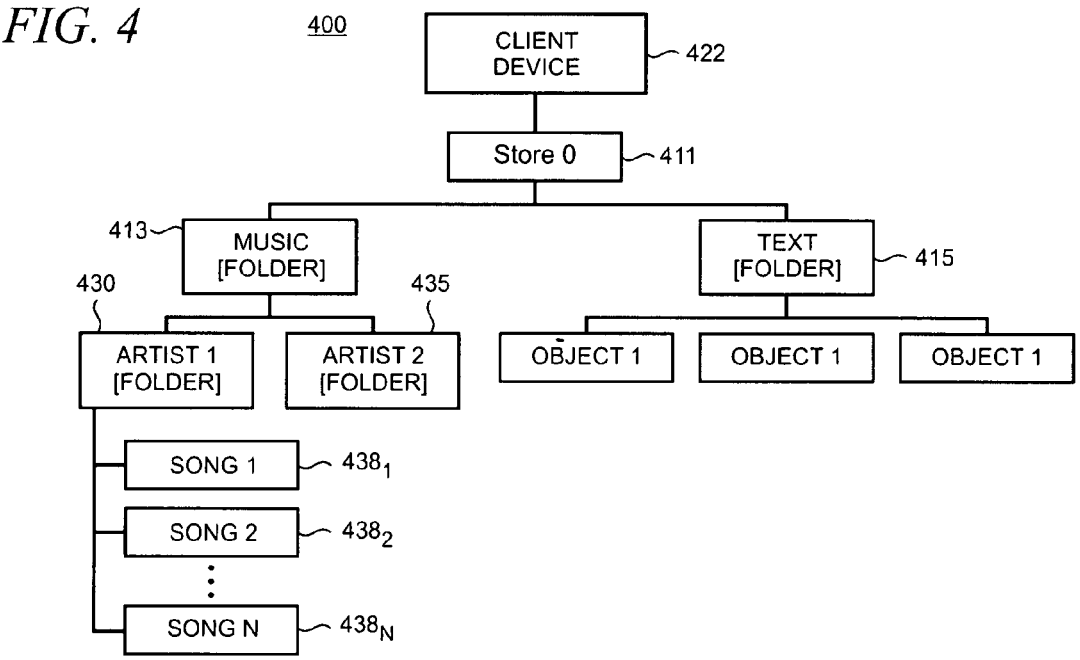
FIG. 4 shows an illustrative object hierarchy that is associated with a specific example of storage under the existing MTP storage model.

FIG. 4 shows an illustrative object hierarchy 400 that is associated with a specific example of storage under the existing MTP storage model. In this example, a storage 411 named "Store 0" exposes a music folder 413 and text folder 415 on a client device 422. The music folder 411 includes two artist folders 430 and 435 for respective artists, "Artist 1" and "Artist 2." Artist Folder 430 includes a multiplicity of songs $438_{1, 2 \ldots N}$, as shown.

By comparison to the existing MTP storage model shown in FIGS. 3 and 4 and described in the accompanying text, in the present device-hosted services model, the way in which a client device is enumerated is modified while still maintaining backwards compatibility with the current MTP implementation. This modification is implemented through the creation of an MTP extension that includes new operations that are configured to enable an initiator to find and access certain types of content on the responder that are exposed through device-hosted services. While MTP presently supports enumeration by format, the new commands enable greater flexibility for applications that deal only with specific content types. The new MTP commands are shown in Table 1 below.

TABLE 1

| Operation Code | Operation Name |
|---|---|
| 0x9301 | GetServiceIDs |
| 0x9302 | GetServiceInfo |
| 0x9303 | GetServiceCapabilities |
| 0x9304 | GetServicePropertyList |
| 0x9305 | SetServicePropertyList |

The GetServiceIDs command operates to return an array (i.e., a list) of service identifiers that can be used in association with another new command in the MTP extension, GetServiceInfo. The GetServiceInfo command takes a ServiceID as a parameter and operates to return a static service definition dataset named "ServiceInfo" for the particular device-hosted service identified by the ServiceID parameter.

The ServiceInfo dataset is generally arranged to define the core properties and interactive elements of device-hosted service. The dataset may be defined, for example, by the media device client vendor such as a mobile phone manufacturer as required to implement a desired set of functionalities and features. The ServiceInfo dataset is further utilized to expose the device-hosted service as a functional object. In this illustrative example, the functional object is used in the object-based WPD infrastructure which is implemented using an in-process COM server to communicate with the MTP driver 138 (FIG. 1). Accordingly, the MTP driver 138 reads the ServiceInfo dataset to create a corresponding WPD functional object. The ServiceInfo dataset is shown below in Table 2.

TABLE 2

| Dataset Field | Field Order | Size (bytes) | Datatype | Description |
|---|---|---|---|---|
| ServiceID | 1 | 4 | UINT32 | Integer that is used to enumerate and address services. |
| ServiceStorageID | 2 | 4 | UINT32 | MTP StorageID that holds the content for a given service. |
| ServiceVersion | 3 | 4 | UINT32 | Version of service implementation. Version for this document is 100 (0x64). |
| ServicePUID | 4 | 16 | UINT128 | PUID that represents a service. Device-defined. |
| ServiceName | 5 | DTS | String | Name for IDispatch, complies with IDispatch rules. |
| BaseServicePUID | 6 | 16 | UINT128 | PUID of the Definition Service that it inherits from. |
| UsesServiceGUIDS | 7 | DTS | AUINT128 | Array of GUIDs that this service "uses". |
| NumProperties | | 4 | UINT32 | Number of properties that apply to the service. |
| PropertyID1 | | 2 | UINT16 | |
| PropertyGUID1 | | 16 | UINT128 | GUID for the property. |
| PropertyName1 | | DTS | String | Name for the property, complies with IDispatch rules. |
| Datatype1 | | 2 | UINT16 | This field identifies the datatype code of the property. |
| Get/Set1 | | 1 | UINT8 | This field indicates whether the property is read-only (Get), or read-write (Get/Set). 0x00 Get 0x01 Get/Set |
| Form Flag1 | | 1 | UINT8 | This field indicates the format of the next field. 0x00 None 0x01 Range form 0x02 Enumeration form 0x03 DateTime form 0x04 Fixed-length Array form 0x05 Regular Expression form 0x06 ByteArray form 0xFF LongString form |
| FORM1 | N/A | <variable> | — | This dataset depends on the Form Flag, and is absent if Form Flag = 0x00. Please see the MTP Specification for the ObjectPropDesc dataset. |
| NumFormats | | 4 | UINT32 | Number of Content-Type/Format pairs supported by the service. May be 0. |
| FormatID1 | | | | |
| FormatInterfaceGUID1 | | 16 | UINT128 | |
| FormatInterfaceName1 | | DTS | String | |
| FormatBaseID1 | | 2 | UINT16 | |
| MIMEType1 | | DTS | String | MIME Type. |
| Format1 | | 2 | UINT16 | MTP Format code supported by the service. |
| ... | | | Repeat the format datasets | |
| NumMethods | | 4 | UINT32 | Number of methods. |
| MethodFormatID | | 2 | UINT16 | |

TABLE 2-continued

| Dataset Field | Field Order | Size (bytes) | Datatype | Description |
|---|---|---|---|---|
| MethodName | | DTS | String | |
| ObjectAssociationFormatID | | 2 | UINT16 | |
| NumEvents | | 4 | UINT32 | Number of events. |
| EventCode1 | | 2 | UINT16 | |
| EventGUID1 | | 16 | UINT128 | |
| Name1 | | DTS | String | |
| NumBytes | | 4 | UINT32 | Amount of data |
| Data | | DTS | AUINT8 | |

While the ServiceInfo dataset may be arranged to contain a number of entries as shown, the significant entry for enumeration purposes is the inclusion of an MTP StorageID. The StorageID identifies the storage that holds the content for a given service, which does not necessarily need to represent a physical storage. The StorageID, if present, may be used in any operation that accepts a StorageID retrieved, for example, using legacy enumeration via the existing GetStorageInfo MTP commands. Like traditional storage implementations, it is possible to have more than one instance of a particular service of type ServiceGUID (where "GUID" is an acronym for Globally Unique Identifier) on a device at a time. For example, consider a contact service implementation on a mobile phone which is capable of storing contacts in device memory as well as on a SIM (subscriber identity module) card. Each of these storage locations is typically configured with different capabilities, the SIM card, for example, being restricted to a name and phone number for each entry, and each are appropriately modeled using the service infrastructure. To enable these services to be distinguished from each other, a different computer readable globally unique identifier is assigned to each service through a persistent unique identifier ("PUID"). This ServicePUID, may then be used to represent the particular instance of the service over multiple connections of the device 110 to the host 102.

Other datasets utilized in the present device-hosted services include service properties and service capabilities. The service property dataset named "ServicePropertyList" provides a modifiable mechanism to set device-hosted service properties and is analogous to the existing ObjectPropList datasets in the current MTP protocol. The ServicePropertyList dataset is shown in Table 3 below.

TABLE 3

| Field name | Field Order | Size (bytes) | Datatype | Description |
|---|---|---|---|---|
| NumberOfElements | 1 | 4 | UINT32 | Count of property quadruples in this dataset. |
| Element1ServiceID | 2 | 4 | ObjectHandle | ServiceID of the object to which Property1 applies. |
| Element1PropertyCode | 3 | 2 | Datacode | Datacode identifying the ObjectPropDesc describing Property1. |
| Element1Datatype | 4 | 2 | Datacode | This field identifies the DatatypeCode of Property1. |
| Element1Value | 5 | DTS | DTS | Value of Property1. |
| Element2ServiceID | 6 | 4 | ObjectHandle | ServiceID of the object to which Property2 applies. |
| Element2PropertyCode | 7 | 2 | Datacode | Datacode identifying the ObjectPropDesc describing Property2. |
| Element2Datatype | 8 | 2 | Datacode | This field identifies the DatatypeCode of Property2. |
| Element2Value | 9 | DTS | DTS | Value of Property2. |
| ElementNServiceID | 4 * N + 1 | 4 | ObjectHandle | ServiceID of the object to which PropertyN applies. |

The GetServicePropertyList command takes the ServiceID as a parameter to return the ServicePropertyList dataset for the particular device-hosted service identified by the ServiceID parameter. An optional ServicePropCode parameter may also be used. If used, the client device 110 (FIG. 1) will return the ServicePropertyList dataset with only the single specified property value. If the optional parameter is not used, then the client device 110 will return all the ServiceProperty values for the device-hosted service specified by the ServiceID parameter. The GetServicePropertyList command operates in a similar manner to the GetObjectPropList command in the current MTP protocol. Likewise, the SetServicePropertyList command is used to send service property information to the device in a manner similar to SetObjectPropList.

The service capabilities dataset named "ServiceCapabilityList" includes a set of properties that can be used to constrain support for given objects. Examples include limiting supported bitrates in an MP3 file (Moving Pictures Expert Group, "MPEG," Audio Layer-3), or read/write capabilities for a contact. Capabilities are typically defined per device-hosted service, and device-wide capabilities (such as those defined in the existing MTP DeviceInfo dataset) may be overridden with service-specific capabilities. The ServiceCapabilityList dataset is shown in Table 4 below.

TABLE 4

| Field name | Field Order | Size (bytes) | Datatype | Description |
|---|---|---|---|---|
| NumObjectPropDesc | 1 | 4 | UINT32 | The number of ObjectPropDesc arrays to follow. May be 0. |
| ObjectPropDesc dataset | N | DTS | DTS | List each of the ObjectPropDesc datasets |
| NumInterdependentSets | | 4 | UINT32 | The number of InterdependentPropDesc datasets to follow. May be 0. |
| InterdependentPropDescdatset | | DTS | DTS | Use this dataset as described in the InterdependentPropDesc dataset in the MTP Spec. |

The GetServiceCapabilities command takes the ServiceID as a parameter to return the ServiceCapabilityList dataset for the particular device-hosted service identified by the ServiceID parameter. An optional FormatCode parameter may also be used. If used, the client device 110 will return only the capabilities for the specified format for that device-hosted service. If the optional parameter is not used, then the client device will return device-hosted service-specific capabilities for all supported formats.

A further feature added to device services is the ability to define service specific events. Like other service elements, these events are identified by name and globally unique ID ("GUID"). Currently MTP events are defined to return three 32-bit values. Likewise service events use this same structure and allow the service to define how the three 32-bit values returned for each event are to be interpreted.

Figure 5:
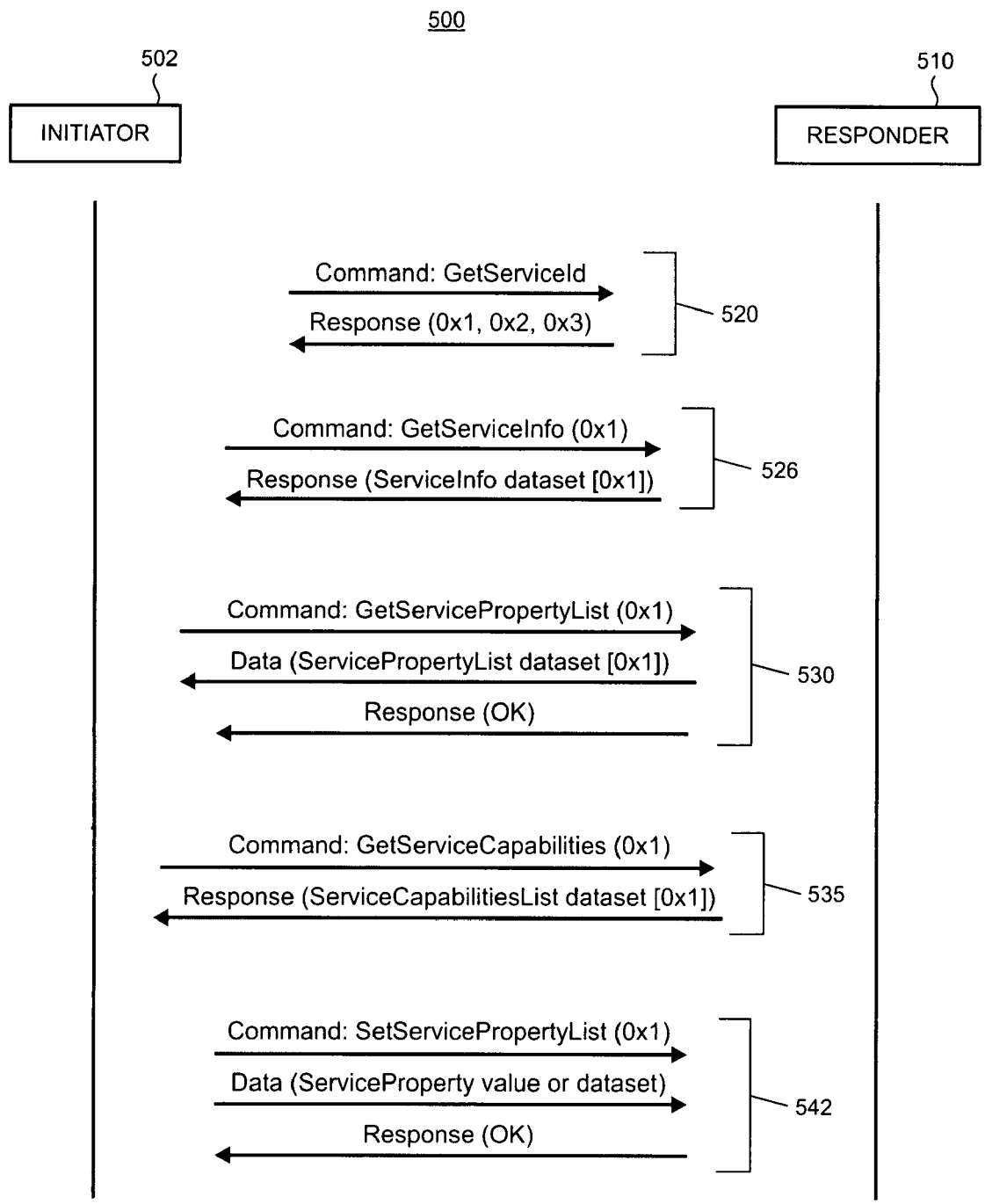
FIG. 5 shows an illustrative command-response message flow between an initiator and responder in association with device-hosted services queries.

FIG. 5 shows an illustrative command-response message flow 500 between the initiator 502 (e.g., host 102 in FIG. 1) and responder 510 (e.g., client device 110) in association with device-hosted services queries. Message flow 500 shows use of the MTP commands in Table 1 executed by the initiator 502 and the responses from the responder 510. As shown, command-response message exchange 520 includes the GetServiceId command and the response which includes a list of services identifiers. Message exchange 526 includes the GetServiceInfo command and the ServiceInfo dataset as the response. Message exchange 530 includes the GetServiceProperty command and the ServicePropertyList dataset as the response. Message exchange 535 includes the GetServiceCapabilities command and the ServiceCapabilitiesList dataset as the response. Message exchange 542 includes the SetServicePropertyList command and the associated data—ServiceProperty value(s) or dataset. The response from the responder 510 will indicate an acknowledgement (e.g., "OK" as shown), or the appropriate status or error message, in a similar manner as the current MTP SetObjectPropList command/response.

Figure 6:
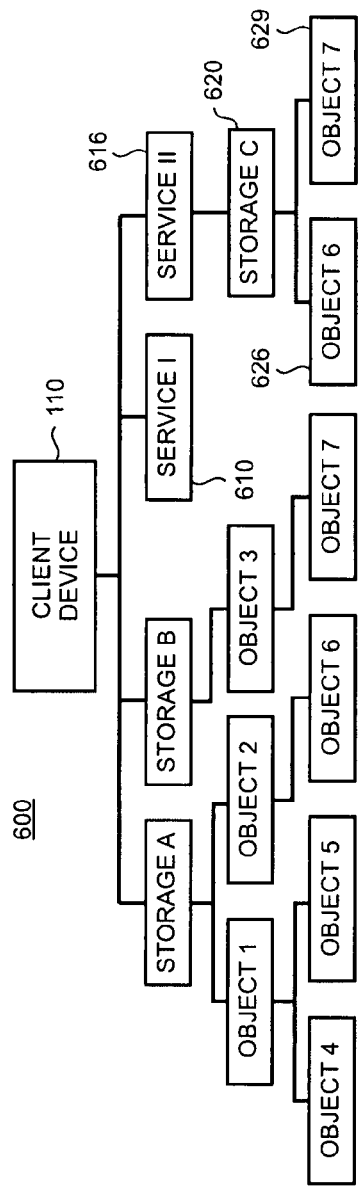
FIG. 6 shows an illustrative generalized object hierarchy as modified through the utilization of device-hosted services.

FIG. 6 shows an illustrative generalized object hierarchy 600 as it is viewed by MTP in light of the modifications provided by the present device-hosted service enumeration. In the example shown, two device-hosted services—Service I (identified by reference numeral 610) and Service II (identified by reference numeral 616)—are enumerated. As shown, Service I 610 is not associated with a storage while Service II 616 is associated with Storage C 620 which holds media objects 6 and 7, as respectively indicated by reference numerals 626 and 629.

The introduction of device-hosted services results in some implications to the legacy access model provided by the current MTP implementation for enumerating objects stored on devices. To ensure that storages attached to services are not seen by legacy hosts unaware of the service model, no storage associated with a service is to be returned as a response to GetStorageID. From the perspective of a service based enumeration, the legacy storages are assumed to be part of a default "legacy service" and must continue to be enumerated via the legacy GetStorageID operation. In this manner, an older client device will still be able to connect and work with a host device that employs the device-hosted service model.

To maintain backwards compatibility, service authors must be aware that support for existing MTP bulk operation commands require the MTP format codes specified for service data objects, and method objects be unique within the domain of the device. There is, however, no restriction imposed that the same format code be used for the same object on two different devices. For example, if MTP format code 0x3009 were to be used by one service on a particular device to imply storage of objects of format A, it cannot be used by a second service on the same device to imply storage of objects of format B. However, on another device, either from the same or different manufacturer, a service author may elect to use MTP format code 0x3009 to represent storage of objects of format B on any service as a matter of design choice.

Since services represent additions to legacy MTP behavior, it is also important that formats defined within services not be listed as part of the standard MTP "DeviceInfo" dataset. Only service-aware hosts 102 should be enabled to discover service formats via GetServiceIDs/GetServiceInfo models. This also implies that bulk enumeration requests made at the device level on service aware implementations must continue to operate at the device level to maintain compatibility with non-service aware implementations.

Figure 7:
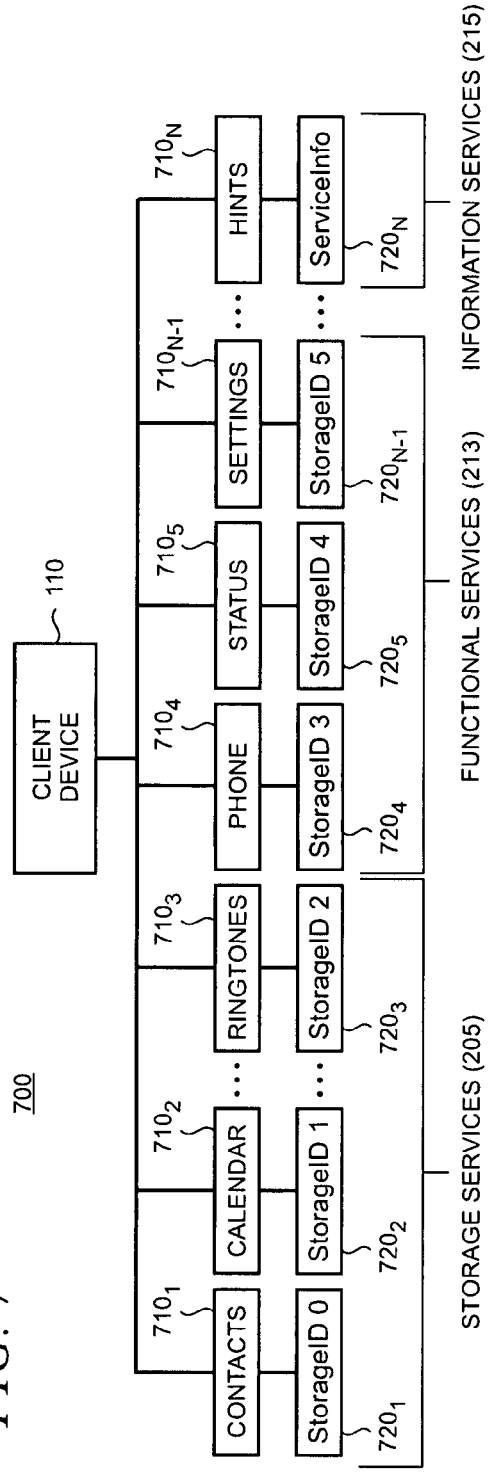
FIG. 7 is a representation of a set of illustrative device-hosted services including storage services, functional device services, and information services.

FIG. 7 shows an MTP object hierarchy 700 for several specific illustrative examples of device-hosted services. These services include storage services 205, functional services 213, and information services 215 that are provided on the client device 110. The storage services 205 include a contacts service $710_1$, a calendar service $710_2$, and a ringtone service $710_3$. The functional services 213 include a phone service $710_4$, a status service $710_5$ and a settings service $710_{N-1}$. A hints service $710_N$ is an example of an information service 215. It is emphasized that these services 710 (storage, functional, and information) are merely illustrative and the specific number, kind, and mix of services provided on a particular media device client will generally depend on the requirements of the application and may vary from that shown in FIG. 7. For example, although not shown, SMS (Short Message System) data and/or wallpaper could also be exposed through the present device-hosted service arrangement. As shown, storages $720_{1, 2 \ldots N-1}$ are attached to respective device-hosted services $710_{1, 2 \ldots N-1}$.

The contacts service $710_1$, calendar service $710_2$, and ringtones service $710_3$ respectively expose contacts, calendar data, and ringtones from their respective attached storages 720 in the client device 110. The storage services 205 behave similarly to the existing MTP storages. However, the present device-hosted service mechanisms provide an enhanced level of description for what types of data are stored in a storage and how that data is used. In addition, while all storage services are backed by some storage location on the client device (and thus may be considered equivalent to a traditional MTP storage in this illustrative example), there is no requirement that the storage be represented on a 1:1 basis with a physical storage device. The storage may be a file system, database, or any collection of data.

Advantageously, a key feature of device-hosted services is that they are arranged to be self-describing so as not to be limited to existing extensibility models within MTP. This feature enables the consumer of the device-hosted service to properly make use of the service solely by discovering it and reading the service description. By comparison, existing MTP behaviors, formats, and objects are all described in a master paper specification maintained by standards organizations or extension authors. Such specification contains a list of all of the "known" formats and properties in MTP. Such formats and properties are 16-bit values with a restricted bit pattern to identify their type. Because of this arrangement, MTP tends to require modification to the host MTP stack to enable new behaviors, formats, and objects to be used. Most MTP host implementations perform a mapping established in device firmware between the MTP format world or MTP function world and some native, platform-specific model. As such, these mapping tables or function stubs must be updated to deal with the new formats, properties, or functions that have been defined. Accordingly, one of the goals of the ServiceInfo dataset is to carry enough information that a host MTP protocol stack (e.g., initiator MTP protocol stack 116 in FIG. 1) may proxy interactions between an unknown piece of software rumbling on the host and the client device without having to be modified.

Additionally, although MTP currently supports an extension mechanism to allow new formats, properties, and functions to be defined, as noted above, it does not do so in a way to guarantee uniqueness and compatibility. While some may argue the present model is mathematically sufficient to support most practical usages, it does not guarantee compatibility because two vendors could easily and legally use the same value to mean two very different things. The current model for conflict resolution requires that these extensions be mutually exclusive such that no one device may use both of the extensions in conflict. Therefore, it is hard to consider these items unique. The self-describing nature of device-hosted services works to resolve this problem by elevating formats, properties, and functions to a larger namespace, represented in terms of GUIDs. This enables device manufacturers to specify any MTP appropriate value on their device while still maintaining compatibility with all implementations of the same service regardless of the manufacturer.

By being self-describing, the device-hosted services have the ability to specify capabilities describing restrictions on the type of objects they expose. This is valuable when a particular service needs to restrict support of objects to a particular format or a particular subset of the format. Using the example of ringtones service $710_3$, the service could be available on the device that restricts all files on the service to be MP3 format, 128 kbps bit rate or less, and less than 30 seconds in duration. In the present illustrative example, such restrictions are provided by ServiceCapabilityList dataset. While existing methods under the current MTP protocol are able to handle this at the device level, there is no way to express these restrictions at a storage level so the device would have to reject files as "invalid" if they are copied to the ringtone location (with the user receiving something like a "not supported" error) rather than having the host computer transcode the content to meet the requirements.

Additionally there is no requirement that device-hosted services be restricted to just the information available in the ServiceInfo data set. It is reasonable to consider services as objects themselves and be able to request properties off the service as needed.

Turning now to the functional device services 213, the general model for functional services is to treat functional requests as object transfers within the existing MTP protocol. A simplified treatment is shown in an illustrative flowchart 800 shown in FIG. 8. The initiator 802 (e.g., host 102 in FIG. 1) and responder 810 (e.g., client device 110 in FIG. 1) make use of "methods" to implement functional services. Methods here are similar to invocations in conventional web services—they are objects that are exchanged between the initiator 802 and responder 810 to pass information related to executable commands.

The initiator 802 passes method object properties 816 to the responder 810 which sends a response 820 back to the initiator 802. The initiator 802 then waits for a completion event to be returned from the responder 810 as indicated by reference numeral 825. In many applications of the present device-hosted services, the method object will not have a binary payload. Instead, it will be 0-byte object with a list of properties. However, in alternative applications, the method object may be optionally implemented in binary, as indicated by reference numeral 822.

Figure 8:
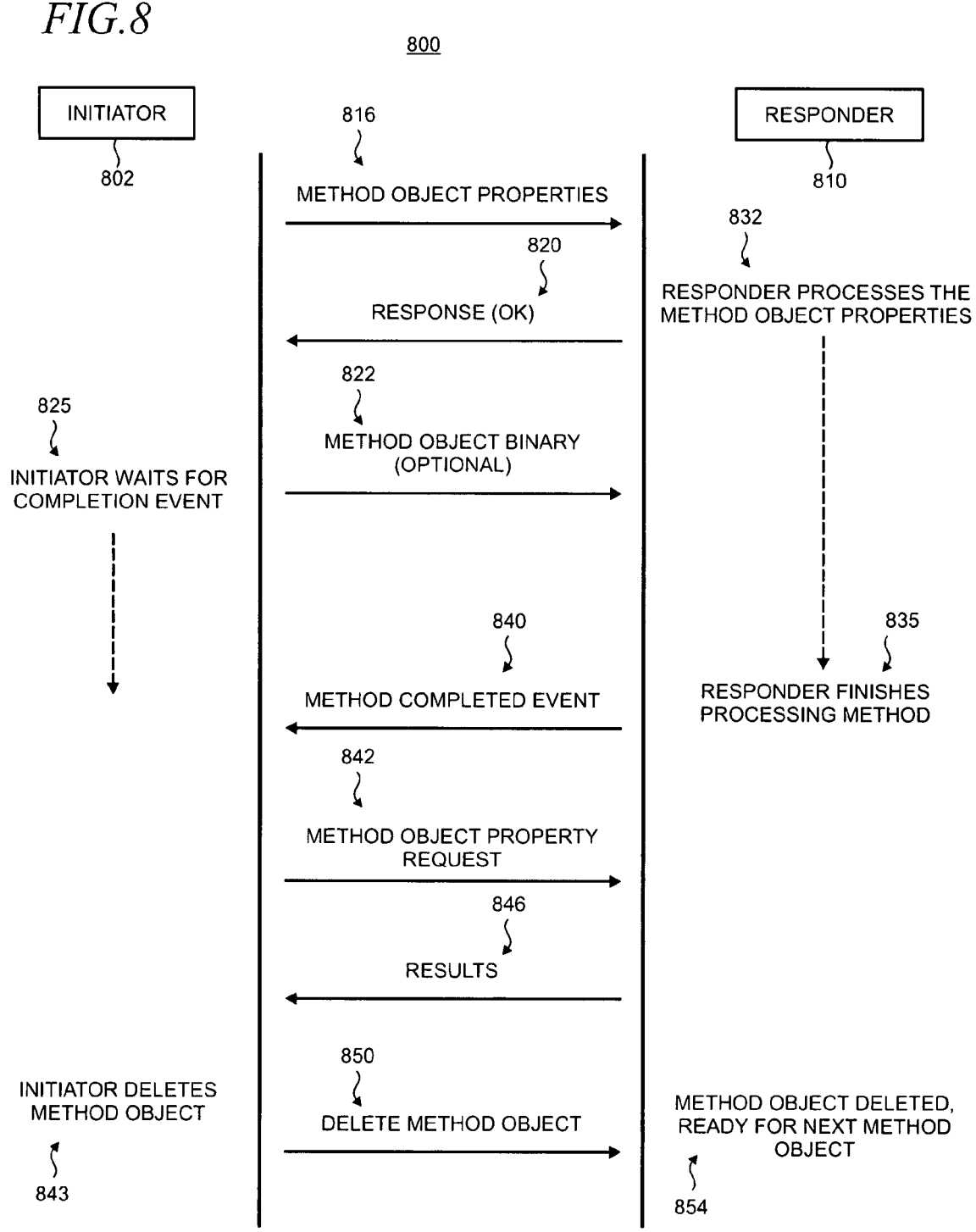
FIG. 8 is an illustrative messaging flowchart that shows object transfers which are implemented in association with functional device services.

The responder 810 processes the method object properties 816, as indicated by reference numeral 832 to thereby perform the function provided by the functional service 213. Upon completion of the processing, shown by reference numeral 835, a method completed event 840 is passed from the responder 810 to the initiator 802. Upon receipt of the method completed event 840, the initiator 802 may retrieve properties or information from responder 810 using a method object property request 842. Again, many applications of the present device-hosted services will only require retrieval of properties, however, alternative applications may result in retrieving results 846 from a method object. Once resulting information has been retrieved, initiator 802 deletes the method object to make way for the next method object as shown by reference numeral 843. The initiator 802 sends a delete method object 850 to the responder 810. As shown by reference numeral 854, the method object is deleted at the responder 810 and is not stored by the responder 810 for later retrieval. It will be appreciated that for simplicity in exposition only a single representative invocation sequence is shown in FIG. 8. The responder 810 may support more than one method invocation at a time—either an invocation of the same method or an invocation of a different method on the same device service, or on another service.

Referring again to FIG. 7, an example of a functional service 213 is phone service $710_4$. In this example, consider the functional request by the host 102 in FIG. 1 to the client device 110 to dial a phone number and remote the incoming and outgoing audio stream to the host 102. The functional phone service $710_4$ representing phone behaviors is defined as one having a verb, "dial," which takes a parameter, the phone number, and returns a result. To initiate the dialing operation, the host 102 uses the existing MTP command SendObjectPropList to send a method object to the phone service, as described above in the text accompanying FIG. 8, with the format specified as the dial verb and the associated property of the phone number.

The client device 110 performs the work required to dial the phone and, upon connection or an error condition, notify the host that the verb object has changed. The client device 110 then requests, via the existing MTP command GetObjectPropList, the result of the operation. The result of the operation would appear as properties on the verb object. In the event of a successful result, the properties may contain the object ID of the call object representing the call requested and the ID of the streams to use to send/receive the encoded audio for the call.

While the "ServiceInfo" dataset contains information about the formats and names of particular method objects, it does not contain details about the properties (or in method terms, arguments), of service method operations. Since method objects appear like standard data objects within MTP, existing operations—GetObjectPropsSupported and GetObjectPropDesc—are capable of being reused to discover this information. In order to facilitate service behavior and naming conventions, additions have been made to the GetObjectPropDesc property forms to allow detailed argument information including name, globally unique identifier (i.e., GUID), parameter order, and argument usage (in, out, in/out) to be supplied. Additionally, new forms are introduced to support richer object-oriented behaviors including the ability to define an argument as being an object ID representing an object of a specific format.

Figure 9:
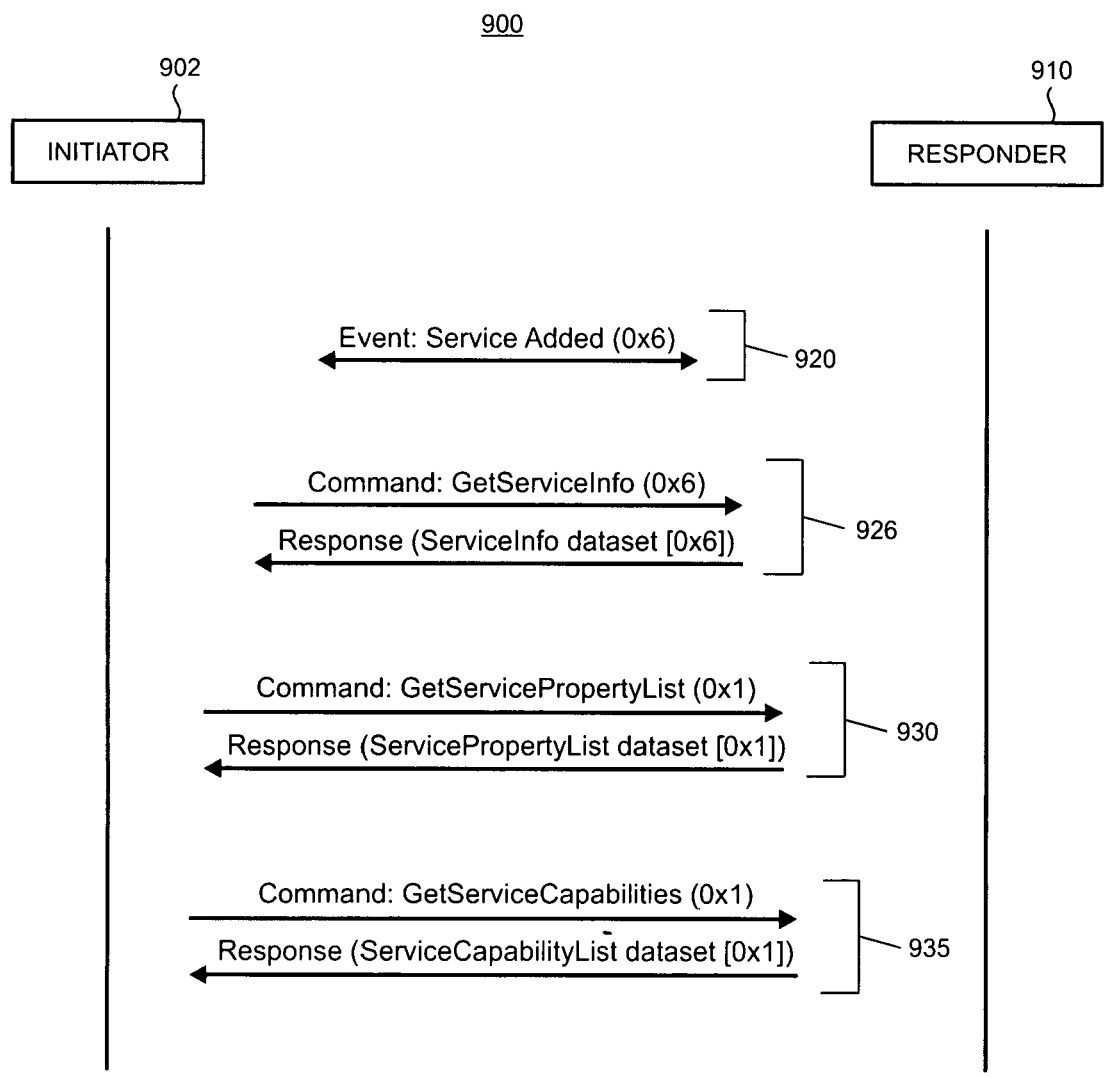
FIG. 9 shows an illustrative command-response message flow between an initiator and responder in association with adding/removing device-hosted services.

Like storages, services are dynamic—they may be added or removed as needed by the client device 110 as shown in illustrative message flow 900 in FIG. 9. A service added event 920 is exchanged between the initiator 902 (e.g., host 102 in FIG. 1) and responder 910 (e.g., client device 110) to indicate that a new service is available on responder 910. The other messages in FIG. 9 (indicated by reference numerals 926, 930 and 935, respectively) follow a similar pattern as that shown in FIG. 5. In the traditional storage world such dynamic behavior makes sense as physical media is added or removed from the device. In the services world, this implies that services could be added by new applications installed on the client device 10. For example if a third-party writes a calendar application, the calendar service $710_2$ (FIG. 7) may be exposed when the application is run in addition to the contacts service $710_1$ that may already be exposed.

Referring again to FIG. 7, the status service $710_5$ exposes various status properties about the client device 110 (i.e., the responder) to the host 102 (i.e., the initiator). Values for such properties, in this illustrative example, may include online/offline, battery life, signal strength, network name, and Bluetooth enabled. The frequency of updates to the status properties is typically chosen by the particular client device being utilized, and a ServicePropChanged event should be sent to the initiator when a device property has been updated. In most applications of the present device-hosted services, the update frequency will take into account the relative client and host PC performance capabilities and will be designed in consideration, for example, of portable device battery life.

The settings service $710_{N-1}$ exposes various settings for the client device 110 (i.e., the responder) to be remotely manipulated by the host 102 (i.e., the initiator). Such settings are typically client device-specific and, accordingly, the particular settings features and functions exposed by the settings service $710_{N-1}$ will vary by device and be a matter of design choice for the service developer (e.g., the device manufacturer).

The hints service $710_N$ provides information to the host 102 to overcome the limitation of existing MTP implementations with respect to identifying device locations to store specific object types within a legacy storage service or particular services. As shown, ServiceInfo $720_N$ is enabled to carry service specific data that may be necessary for the proper operation of the service. Some services, such as the hints service $710_N$, may need to simply present a rich, static dataset of information to the host 102 rather than providing additional storage or functional capabilities. Such services, referred to as information services 215, provide additional information about a particular device that would not otherwise be able to be provided. In the case of the hints service $710_N$, an exemplary dataset would typically contain an MTP format code, a storage ID, and a parent object ID to uniquely identify the preferred location for the host to store objects of the specified format.

Figure 10:
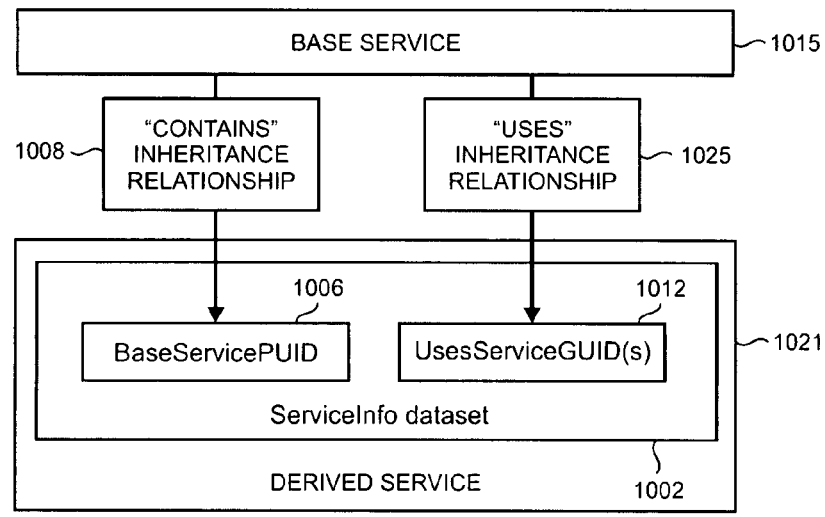
FIG. 10 is a diagram showing an illustrative model by which service behaviors may be inherited from one device-hosted service to another.

Certain object-oriented paradigms may be utilized to provide benefits when constructing device-hosted service architectures. One of the most useful of such paradigms is the ability to model inheritance of service behavior from one service to another or from one object to another, within a particular service. As indicated in Table 2 and shown in FIG. 10, the "ServiceInfo" dataset 1002 provides information about hierarchical relationships among the different objects in a service. At the service level, two fields define the inheritance properties of the service. The first field, a BaseServicePUID (indicated by reference numeral 1006), allows a service implementer to indicate that one instance of a service directly contains the behaviors of another service by specifying a Service PUID for the base service. This "contains" inheritance relationship 1008 thus implies that for all formats and methods defined on a base service 1015, the formats and methods defined on a derived service 1021 represent extended implementation which contains the base implementation. That is, creation of an object of a particular format specified by the base service 1015 on that base service 1015 causes an object of the derived type to also be created on the derived service 1021. The use of inheritance relationships may be beneficial when a particular service is required to participate in some pre-defined behavior specified by the base service but lacks all of the desired functionality for richer interactions.

The second field, UsesServiceGUIDs (indicated by reference numeral 1012), is an array of zero or more service type GUIDs that are used to define the implementation of a current service. In traditional object-oriented programming paradigms this is an "implements" relation. Like the "contains" relationship, all information on a "uses" inheritance relationship (indicated by reference numeral 1025) is also available as part of the definition of the derived service 1021. However, creation of objects on the derived service 1021 does not also cause objects to be created on the uses service. The uses inheritance relationship may be particularly useful to define aggregation behavior in a service oriented paradigm. For example, it enables a device to specify one generic pattern for a particular service, the uses service, and then allows multiple services to inherit from the uses service rather than having to replicate the same information on all services. The device-hosted services on a particular device that are present solely to provide contracts for use as a UsesServiceGUID are referred to as abstract services and do not specify Storage IDs preventing persistence of objects or invocation of methods.

In addition to service level inheritance, the definition of the "ServiceInfo" dataset defines detailed relationships at the data object and method object level. In the case of data objects, support for "contains" relationships generally requires that a data object in the derived service 1021 be able to specify the data object in the base service 1015 that it contains. This relationship is defined using the FormatBaseID field for each of the data formats defined.

In the case of method objects, associations are generally required to define the data object with which it is associated. In some cases, method objects may apply to the entire service. Returning to the contact example, a service method object might be defined which enables a contact to be created from a particular dataset such as a standard vCard (originally called a "Versitcard") data stream. In this case, the method is associated with the service object, not an individual data object.

In addition, certain data object formats may themselves support methods. For example, a contact object created by the service method which translates the object from a vCard stream may have a method to associate the contact object with a particular ringtone to be played when a phone call is received from that contact.

Figure 11:
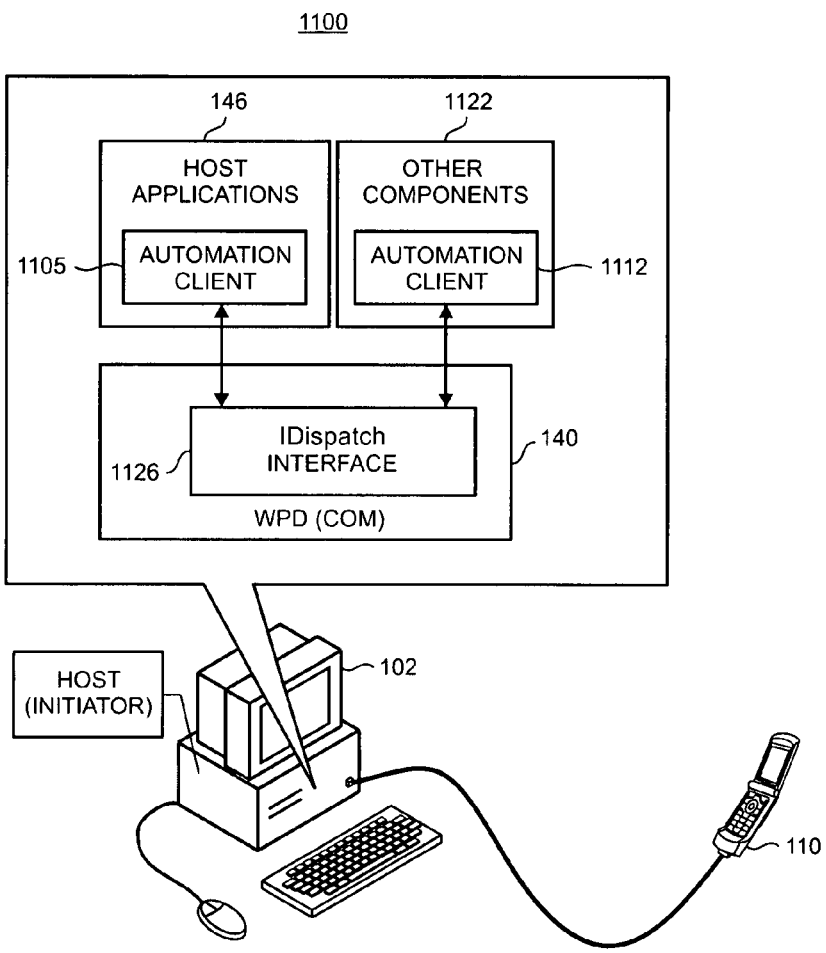
FIG. 11 shows an illustrative arrangement for exposing device-hosted services to automation clients in a scripting or other programming environment.

Turning now to the scripted device services 218 (FIG. 2) which are used to implement a scripting or other programming environment, FIG. 11 shows an illustrative arrangement 1100 for exposing device-hosted services to automation clients on an initiator (e.g., host 102). Such automation clients, indicated by reference numerals 1105 and 1112 respectively, may be arranged as functional elements in a host application 146 and/or be arranged as part of some other component 1122 that runs on the host 102. Such component 1122 represents any of a variety of host-based functionality that may be provided, for example, by a process, method, thread, etc.

In Windows implementations, an IDispatch interface 1126 is provided to expose the device-hosted services on the client device 110 to the automation clients 1105 and 1112. COM components 102 implement the IDispatch 1126 to enable access by the automation clients 1105 and 1112 which may be implemented through ActiveX or other automation server or programming tool, typically using C++ or Visual Basic, for example. However, it is emphasized that the present arrangement for device-hosted services is not limited to Windows APIs and programming models and similar known automation interfaces may be implemented in non-Windows settings according to the requirements of a particular implementation.

For example, it is possible to adapt the solution proposed for use in different scripting environments, such as Java, based on the particular needs of an operating system. One of the richest opportunities in the present scripting and programming model is to expose to device side application developers the ability to create new services and handle the associated service requests. For example, in the mobile phone environment a third-party application developer would be able to leverage support in the Java environment to create and install a new service on the device. When the device is connected to Windows, or another platform, the device side Java application would be able to respond to service requests from the MTP host enabling device application developers to create richer data exchange models with PC versions of the same application. While scripting may often be preferably utilized to implement automation, it will be appreciated that similar functionalities may also be typically provided using native code in either procedural or declarative contexts, or combinations thereof.

Given the device-hosted services described herein, a set of computer executable methods can be defined that will enable any MTP device-hosted service present on a client device connected to a Windows PC to be exposed as a scriptable IDispatch component. This is accomplished by leveraging two base classes that bind between the IDispatch world and the device-hosted services world.

The first, referred to here as IWPDDispatchableService, represents the service itself. It exposes methods for creating objects of each of the types identified in the service as well as providing direct access to the properties associated with the service. The implementation of this service is based upon the existing WPD Device API and uses the extensions provided to this API for device-hosted services to get at the information used. In addition to exposing access to the service objects and properties, any device-hosted service methods that are bound to the service itself may also be exposed.

Objects are built on top of a similar interface referred to here as IWPDDispatchableObject. Objects of this type expose both the properties and methods associated with the object as defined by the service present on the device in addition to basic functionality for modifying, deleting, or committing changes on the object.

In both cases, the information carried on the device as part of the ServiceInfo dataset provides names and meaning to the different properties and methods exposed. Given the ability of the existing MTP protocol to provide detailed information about both formats (objects/methods) and properties, it is also possible to perform reasonable error handling within the host PC base objects prior to submitting it to the client device. It will be appreciated that both the IWPDDispatchableService and IWPDDispatchableObject also have the ability to cache properties and requests according to common scenarios, such as initializing a new object, in such a manner that the number of round trips to the client device may be minimized to thereby improve performance.

It is anticipated that the settings service $710_N$, alone or in combination with the status service $710_S$, as part of a scriptable environment, may be used to facilitate such services as diagnostic and troubleshooting, device set up and configuration, installation and management of new device applications and functionalities. For example, when looking to diagnose and repair a problem, a client device user can connect the device to the user's PC and then direct the PC's web browser to the device manufacturer's website. The status and settings services respectively expose device status and remote control functionalities to thereby enable more effective troubleshooting and repair to be effectuated as a web-hosted application from the device manufacturer. Of course, such service is merely illustrative, and those skilled in the art will appreciate that a variety of different web experiences may be implemented using the present device-hosted services as may be required by a specific application.

The ability to access rich services available on any device directly from such thin-client environments like web page may pose a significant security threat to the device. For example, a user might be socially engineered to click on a web page which results in the contents of their device being read or erased. Accordingly, different security methods may be implemented to help prevent such inappropriate uses. In one case, the device-hosted service itself might define a model for obtaining and employing a secure communication after establishing a level of trust based on a mutually shared secret. Alternatively, access to the client device may be limited to only those web pages which have been approved to access the device, for example the client device manufacturer's site (as described in the example above). In addition, conventional methods for creating a secure, private web environment may be implemented to enable all web pages to be validated and authorized which would enable anyone desiring to support the requirements to be granted access to the client device.

Once a secure context is put in place, it may then become reasonable to assume that all authorized participants in the context have the ability to connect to and use a particular device-hosted service. In order to support such a model, it also becomes necessary to expose methods for discovering the number and types of devices supported within the context as well as discover each of the services they offer.

The methods defined here are specific to creating a web context for accessing the device. It will be appreciated that other development models exist which may also benefit from being able to access the device-hosted services on a particular client device. To facilitate development within these models it is appreciated that services may also be exposed to these non-scripting environments. Allowing this binding to occur implies that the necessary requirements of the target environment have been met.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for identifying a location for stored objects on a device, the method comprising the steps of:
    storing the objects in one or more data stores on the device;
    associating the one or more data stores with MTP device services that are hosted on the device, the MTP device services being defined by an extension to an MTP protocol so that GetObjectPropDesc and GetObjectPropsSupported operations defined by the MTP protocol are both replaced by a GetServicesCapabilities operation defined by the extension and a GetObjectPropVal operation defined by the MTP protocol is replaced by a GetObjectPropList operation defined by the extension; and
    exposing the objects in the one or more data stores through the MTP device services to a services consumer in an MTP session.

2. The method of claim 1 in which the one or more data stores comprise virtual stores that are associated with a physical store on the device, the MTP device services being arranged to expose selected ones of the virtual stores to the services consumer.

3. The method of claim 1 in which the services consumer runs on a host selected from a group consisting of PC, laptop PC, desktop PC, multimedia PC, consumer electronic device, set top box, game console, and combinations thereof.

4. The method of claim 3 in which the services consumer is implemented in one of application, process, or thread, the application, process, or thread running on the host.

5. The method of claim 1 in which the exposing is arranged to be backwards compatible with existing MTP implementations by hiding selected data stores.

6. The method of claim 1 in which the device is a client device selected from a group consisting of consumer electronic device, mobile phone, PDA, pocket PC, smart phone, handheld game player, GPS device, navigation device, digital still camera, digital video camera, audio player, multimedia player, and combinations thereof.

7. The method of claim 1 in which the exposing comprises bulk enumeration of objects.

8. The method of claim 1 in which the one or more data stores comprise a true object store.

9. The method of claim 1 in which the steps of storing, associating and exposing is performed on an ad-hoc basis.

10. A method of accessing a device-hosted service, the method comprising the steps of:
    establishing a communication session with a device that hosts the device-hosted service;
    invoking the device-hosted service through use of an MTP extension to an MTP protocol, the MTP extension including commands which pass one or more service-specific parameters to the device-hosted service and where GetObjectPropDesc and GetObjectPropsSupported operations defined by the MTP protocol are both replaced by a GetServicesCapabilities operation defined by the extension and a GetObjectPropVal operation defined by the MTP protocol is replaced by a GetObjectPropList operation defined by the extension; and
    receiving data exposed through the device-hosted service responsively to the invoking, the received data describing i) the device-hosted service, or ii) methods associated with objects exposed by the service, or iii) parameters associated with the objects.

11. The method of claim 10 in which the MTP extension includes a command that invokes a response from the device-hosted service having one or more service identifiers.

12. The method of claim 10 in which the MTP extension includes a command that invokes a response from the device-hosted service having a service information dataset.

13. The method of claim 10 in which the MTP extension includes a command that invokes a response from the device-hosted service having a service property list dataset.

14. The method of claim 10 in which the MTP extension includes a command that invokes a response from the device-hosted service having a service capability list dataset.

15. The method of claim 10 in which the MTP extension includes a command that sets a device parameter or device value.

16. The method of claim 10 in which the commands in the MTP extension are self-describing.

17. A method for discovering MTP device services hosted by a portable device, the method comprising the steps of:
    establishing an MTP session with the portable device;
    querying the portable device through a message based interaction over the MTP session to request a description of one or more MTP device services that are supported by the portable device, the MTP device services being arranged to expose objects associated with the portable device and the MTP device services being defined by an extension to an MTP protocol so that GetObjectPropDesc and GetObjectPropsSupported operations defined by the MTP protocol are both replaced by a GetServicesCapabilities operation defined by the extension and a GetObjectPropVal operation defined by the MTP protocol is replaced by a GetObjectPropList operation defined by the extension; and
    manipulating the objects exposed through the one or more MTP device services in accordance with parameters contained in the description.

18. The method of claim 17 in which the message based interaction comprises an exchange of method objects between an MTP initiator and an MTP host.

19. The method of claim 18 in which the method objects include either information or commands.

20. The method of claim 17 in which the objects comprise media objects that are associated with one of storage services, functional device services, or information services.

* * * * *

UNITED STATES PATENT AND TRADEMARK OFFICE
CERTIFICATE OF CORRECTION

PATENT NO. : 8,201,188 B2  
APPLICATION NO. : 11/903039  
DATED : June 12, 2012  
INVENTOR(S) : Darren Davis et al.

Page 1 of 1

It is certified that error appears in the above-identified patent and that said Letters Patent is hereby corrected as shown below:

In column 6, line 4, delete "or responder" and insert -- part of a --, therefor.

In column 6, line 21, delete "Compatible" and insert -- MTP-compatible --, therefor.

In column 19, line 55, delete "10." and insert -- 110. --, therefor.

Signed and Sealed this
Sixteenth Day of October, 2012

David J. Kappos
*Director of the United States Patent and Trademark Office*